United States Patent
Faxér et al.

(10) Patent No.: US 11,228,356 B2
(45) Date of Patent: Jan. 18, 2022

(54) CONFIGURATION OF RESOURCES FOR DOWNLINK CSI MEASUREMENTS

(71) Applicant: Telefonaktiebolaget LM Ericsson (publ), Stockholm (SE)

(72) Inventors: Sebastian Faxér, Järfälla (SE); Shiwei Gao, Nepean (CA); Sara Sandberg, Luleå (SE); Arne Simonsson, Gammelstad (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 188 days.

(21) Appl. No.: 16/335,329

(22) PCT Filed: Sep. 12, 2018

(86) PCT No.: PCT/EP2018/074668
§ 371 (c)(1),
(2) Date: Mar. 21, 2019

(87) PCT Pub. No.: WO2020/052755
PCT Pub. Date: Mar. 19, 2020

(65) Prior Publication Data
US 2020/0358502 A1    Nov. 12, 2020

(51) Int. Cl.
*H04B 7/06* (2006.01)
*H04B 17/336* (2015.01)
(Continued)

(52) U.S. Cl.
CPC ......... *H04B 7/0626* (2013.01); *H04B 17/336* (2015.01); *H04L 5/0051* (2013.01);
(Continued)

(58) Field of Classification Search
CPC ............... H04B 7/0626; H04B 17/336; H04W 72/0446; H04W 24/10; H04L 5/0051; H04L 5/0062
See application file for complete search history.

(56) References Cited

U.S. PATENT DOCUMENTS

| | | | | |
|---|---|---|---|---|
| 10,034,283 | B2 * | 7/2018 | Yerramalli | ........ H04W 72/0446 |
| 10,681,687 | B2 * | 6/2020 | Davydov | ............ H04W 72/042 |

(Continued)

FOREIGN PATENT DOCUMENTS

| | | | | |
|---|---|---|---|---|
| WO | 2015066663 | A1 | 5/2015 | |
| WO | WO-2018030756 | A1 * | 2/2018 | ........... H04B 7/0626 |

OTHER PUBLICATIONS

ETSI 3rd Generation Partnership Project, "LT3; Evolved Universal Terrestrial Radio Access (E-UTRA) Physical channels and modulation (3GPP TS 36.211 version 15.2.0 Release 15)", ETSI TS 136 211 V15.2.0, Oct. 2018, pp. 1-238.
(Continued)

*Primary Examiner* — Deepa Belur
(74) *Attorney, Agent, or Firm* — Coats & Bennett, PLLC

(57) ABSTRACT

There is provided mechanisms for configuring resources for downlink CSI measurements. A method is performed by a network node. The method comprises configuring, within a radio frame, the resources for downlink CSI measurements. The resources for downlink CSI measurements comprise at least two resources for interference measurements and at least one resource for channel measurements. Each resource for interference measurement is configured in its own slot within the radio frame. The method comprises transmitting configuration information. The configuration information specifies slot locations of the at least two resources for interference measurement and the at least one resource for channel measurement within the radio frame. The method
(Continued)

| Radio fram index | n | | | | | | | | | |
|---|---|---|---|---|---|---|---|---|---|---|
| Slot index | k | k+1 | k+2 | k+3 | k+4 | k+5 | k+6 | k+7 | k+8 | k+9 |
| Slots | D | x | U | U | U | D | D | D | D | D |
| Channel measurement resource (CSI-RS) | CSI-RS | | | | | | | | | |
| Measured channel | c(k) | | | | | | | | | |
| Interference measuremnet (CSI-IM) | CSI-IM | | | | | CSI-IM | CSI-IM | CSI-IM | CSI-IM | CSI-IM |
| Measured Interference | i(k) | | | | | i(k+5) | i(k+6) | i(k+7) | i(k+8) | i(k+9) |
| Filtered interference | i(k) | | | | | i(k+5) | i(k+6) | i(k+7) | i(k+8) | i(k+9) |
| CSI estimate and report | CSI(m) | | | | | | | | | | comprises transmitting, within the radio frame, a reference signal in the at least one resource for channel measurements.

29 Claims, 11 Drawing Sheets

(51) Int. Cl.
    *H04L 5/00*         (2006.01)
    *H04W 24/10*      (2009.01)
    *H04W 72/04*      (2009.01)

(52) U.S. Cl.
    CPC ........... *H04L 5/0062* (2013.01); *H04W 24/10* (2013.01); *H04W 72/0446* (2013.01)

(56) References Cited

U.S. PATENT DOCUMENTS

| | | | |
|---|---|---|---|
| 2015/0172950 A1* | 6/2015 | Chen | H04W 24/10 370/252 |
| 2016/0050648 A1* | 2/2016 | Seo | H04W 72/0406 370/329 |
| 2016/0119917 A1* | 4/2016 | Yang | H04W 72/042 370/336 |
| 2016/0242054 A1* | 8/2016 | Lee | H04B 17/345 |
| 2017/0078909 A1* | 3/2017 | Davydov | H04L 1/0003 |
| 2017/0181182 A1* | 6/2017 | Patel | H04W 72/1268 |
| 2018/0092088 A1 | 3/2018 | Song et al. | |
| 2018/0098234 A1* | 4/2018 | Kim | H04B 7/0478 |
| 2019/0356364 A1* | 11/2019 | Maamari | H04L 5/0062 |

OTHER PUBLICATIONS

ETSI 3rd Generation Partnership Project, "5G; NR; Radio Resource Control (RRC); Protocol specification (3GPP TS 38.331 version 15.2.1 Release 15)", ETSI TS 138 331 V15.2.1, Jun. 2018, pp. 1-299.

* cited by examiner

| Radio fram index | n | | | | | | | | | |
|---|---|---|---|---|---|---|---|---|---|---|
| Slot index | k | k+1 | k+2 | k+3 | k+4 | k+5 | k+6 | k+7 | k+8 | k+9 |
| Slots | D | x | U | U | U | D | D | D | D | D |
| Channel measurement resource (CSI-RS) | CSI-RS | | | | | | | | | |
| Measured channel | c(k) | | | | | | | | | |
| Interferance measuremnet (CSI-IM) | CSI-IM | | | | | | | | | |
| Measured Interference | i(k) | | | | | | | | | |
| CSI estimate and report | CSI(m) | | | | | | | | | |

Fig. 1

| Cell | Slot number | | | | | | | | | |
|---|---|---|---|---|---|---|---|---|---|---|
| | 0 | 1 | 2 | 3 | 4 | 5 | 6 | 7 | 8 | 9 |
| 1 | D | X | U | U | x | D | X | U | U | X |
| 2 | D | X | U | U | x | D | D | D | D | D |

| Radio fram index | n | | | | | | | | | |
|---|---|---|---|---|---|---|---|---|---|---|
| Slot index | k | k+1 | k+2 | k+3 | k+4 | k+5 | k+6 | k+7 | k+8 | k+9 |
| Slots | D | x | U | U | U | D | D | D | D | D |
| Channel measurement resource (CSI-RS) | CSI-RS | | | | | | | | | |
| Measured channel | c(k) | | | | | | | | | |
| Interferance measuremnet (CSI-IM) | CSI-IM | | | | | CSI-IM | CSI-IM | CSI-IM | CSI-IM | CSI-IM |
| Measured Interference | i(k) | | | | | i(k+5) | i(k+6) | i(k+7) | i(k+8) | i(k+9) |
| CSI estimate and report | CSI(m) | | | | | CSI(m+1) | CSI(m+2) | CSI(m+3) | CSI(m+4) | CSI(m+5) |

Fig. 7

| Radio fram index | n | | | | | | | | | |
|---|---|---|---|---|---|---|---|---|---|---|
| Slot index | k | k+1 | k+2 | k+3 | k+4 | k+5 | k+6 | k+7 | k+8 | k+9 |
| Slots | D | x | U | U | U | D | D | D | D | D |
| Channel measurement resource (CSI-RS) | CSI-RS | | | | | | | | | |
| Measured channel | c(k) | | | | | | | | | |
| Interferance measuremnet (CSI-IM) | CSI-IM | | | | | CSI-IM | CSI-IM | CSI-IM | CSI-IM | CSI-IM |
| Measured Interference | i(k) | | | | | i(k+5) | i(k+6) | i(k+7) | i(k+8) | i(k+9) |
| CSI estimate and report | CSI(m) | | | | | | | | | |

Fig. 8

| Radio fram index | n | | | | | | | | | |
|---|---|---|---|---|---|---|---|---|---|---|
| Slot index | k | k+1 | k+2 | k+3 | k+4 | k+5 | k+6 | k+7 | k+8 | k+9 |
| Slots | D | x | U | U | U | D | D | D | D | D |
| Channel measurement resource (CSI-RS) | CSI-RS | | | | | CSI-RS | CSI-RS | | | |
| Measured channel | c(k) | | | | | C(k+5) | C(k+6) | | | |
| Interferance measuremnet (CSI-IM) | CSI-IM | | | | | CSI-IM | CSI-IM | CSI-IM | CSI-IM | CSI-IM |
| Measured Interference | i(k) | | | | | i(k+5) | i(k+6) | i(k+7) | i(k+8) | i(k+9) |
| CSI estimate and report | CSI(m) | | | | | CSI(m+1) | CSI(m+2) | CSI(m+3) | CSI(m+4) | CSI(m+5) |

Fig. 9

| Radio fram index | n | | | | | | | | | |
|---|---|---|---|---|---|---|---|---|---|---|
| Slot index | k | k+1 | k+2 | k+3 | k+4 | k+5 | k+6 | k+7 | k+8 | k+9 |
| Slots | D | x | U | U | U | D | D | D | D | D |
| Channel measurement resource (CSI-RS) | CSI-RS | | | | | | | | | |
| Measured channel | c(k) | | | | | | | | | |
| Interferance measuremnet (CSI-IM) | CSI-IM | | | | | CSI-IM | CSI-IM | CSI-IM | CSI-IM | CSI-IM |
| Measured Interference | i(k) | | | | | i(k+5) | i(k+6) | i(k+7) | i(k+8) | i(k+9) |
| Filtered interference | i(k) | | | | | i(k+5) | i(k+6) | i(k+7) | i(k+8) | i(k+9) |
| CSI estimate and report | CSI(m) | | | | | | | | | |

Fig. 10

| Radio fram index | n | | | | | | | | | |
|---|---|---|---|---|---|---|---|---|---|---|
| Slot index | k | k+1 | k+2 | k+3 | k+4 | k+5 | k+6 | k+7 | k+8 | k+9 |
| Slots | D | x | U | U | U | D | D | D | D | D |
| Channel measurement resource (CSI-RS) | CSI-RS | | | | | | | | | |
| Measured channel | c(k) | | | | | | | | | |
| Interferance measuremnet (CSI-IM) | CSI-IM | | | | | CSI-IM | CSI-IM | CSI-IM | CSI-IM | CSI-IM |
| Measured Interference | i(k) | | | | | i(k+5) | i(k+6) | i(k+7) | i(k+8) | i(k+9) |
| Filtered interference | i(k) | | | | | i(k+5) | i(k+6) | i(k+7) | i(k+8) | i(k+9) |
| CSI estimate and report | CSI(m) | | | | | | | CSI(m+1) | | CSI(m+2) |

Fig. 11

CONFIGURATION OF RESOURCES FOR DOWNLINK CSI MEASUREMENTS

TECHNICAL FIELD

Embodiments presented herein relate to a method, a network node, a computer program, and a computer program product for configuring resources for downlink channel state information (CSI) measurements. Embodiments presented herein further relate to a method, a terminal device, a computer program, and a computer program product for receiving configuration of resources for downlink CSI measurements.

BACKGROUND

In communications networks, there may be a challenge to obtain good performance and capacity for a given communications protocol, its parameters and the physical environment in which the communications network is deployed.

For example, one parameter in providing good performance and capacity for a given communications protocol in a communications network is the ability to communicate using time division duplex (TDD). In TDD, some subframes/slots are allocated for downlink transmissions (i.e., from the network node at the network side towards terminal devices served in the network by the network node) and some subframes/slots are allocated for uplink transmissions (i.e. from the terminal devices towards the network node). The switch between downlink and uplink occurs in so-called special subframes (using Long Term Evolution (LTE), or fourth generation telecommunication systems, terminology) or so-called flexible subframes (using new radio (NR), or fifth generation telecommunication systems, terminology).

As illustrated in Table 1, which is identical to Table 4.2-2 in 3GPP TS 36.211 V15.2.0 (2018 Jul. 5), in LTE, and where "D" denotes downlink subframes, "U" denotes uplink subframes, and "S" denotes flexible subframes, seven different uplink-downlink configurations are provided.

TABLE 1

LTE uplink-downlink configurations

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

The size of the guard period (as defined by the number of uplink and downlink symbols in the flexible slot(s)) and hence the number of symbols for the downlink pilot time slot (DwPTS), and uplink pilot time slot (UwPTS) in the special subframe, can also be configured from a set of possible selections.

NR on the other hand provides many different uplink-downlink configurations. There could be 10 to 320 slots per radio frame (where each radio frame has a duration of 10 ms) depending on subcarrier spacing. Each slot can be configured with a slot format as shown in Table 4.3.2-3 in 3GPP TS 38.211, V15.2.0. As an alternative to this, a semi-static TDD uplink-downlink configuration may be used where the TDD configuration is provided via radio resource control (RRC) configuration using the information element (IE) denoted TDD-UL-DL-ConfigCommon as specified in 3GPP TS 38.331, V15.2.1. The number of uplink and downlink slots, as well as the guard period may be almost arbitrarily configured within the TDD periodicity. This allows for very flexible uplink-downlink configurations.

Channel state information (CSI) and interference information, for example usable for scheduling and link adaptation, can be reported by the terminal device to the network node on a periodic, semi-persistent or a-periodic basis. Typically, the faster the physical radio propagation channel between the terminal device and the network node varies the shorter the reporting periodicity should be. For periodic or semi-persistent CSI reporting, there is an associated periodicity and slot offset for transmitting the CSI reports. The periodicity may vary from only a few milliseconds to hundreds of milliseconds. For example, in NR, the CSI reporting periodicity could be either 5, 10, 20, 40, 80, 160, 320, or 640 slots. For periodic and semi-persistent CSI reporting, the slot offset is the starting slot within each reporting period in which CSI is measured by the terminal device. Thus, any slot can be configured as the starting slot. For semi-persistent CSI reporting on the physical uplink shared channel (PUSCH), the slot offset is with respect to the slot in which the activation downlink control information (DCI) is transmitted and is dynamically indicated in the activation DCI from a set of preconfigured values.

Resource for channel state information reference signals (CSI-RS) and resource for channel state information interference measurements (CSI-IM) are typically configured with the same periodicity and offset and measured in the same slot, for example as shown in FIG. 1. FIG. 1 illustrates an example of a per radio frame CSI report configured with one CSI-RS resource and one CSI-IM resource for channel and interference measurements, respectively at slot index k. One CSI report (denoted CSI(m)) is formed and is derived based on a measurement c(k) of the channel and a measurement i(k) of the interference as measured at slot with index k. The channel measurement c(k) typically consists of a plurality of channel matrices each associated with a resource block (RB) in the frequency bandwidth of interest. A channel matrix generally consists of values representing measured radio channels (each with an amplitude and a phase) between each receiving antenna at a terminal device and each transmit antenna port at the network node serving the terminal device. Similarly, the interference measurement i(k) typically consists of a plurality of interference covariance matrices each associated with an RB in the same frequency bandwidth of interest. An interference covariance matrix generally represents the interference measured on the receiving antennas at a terminal device. CSI is typically derived by a terminal device in each frequency subband within the bandwidth of interest based on the channel measurement c(k), the interference measurement i(k), and also the receiver capability of the terminal device such as interference rejection capability. There are generally multiple subbands defined in the LTE and NR standards for a given bandwidth and thus multiple such CSIs are generally estimated, each for one subband. There can also be a wideband CSI which is derived over the whole bandwidth. CSI can generally consist of one or more of a rank indicator (RI), an antenna precoding matrix indicator (PMI), and a channel quality indicator (CQI). RI is used to indicate how many data layers or streams the terminal device can be scheduled in a subframe or a slot, whilst PMI indicates the preferred precoding matrix that the network node can be used to send data to the terminal device, and CQI indicates the modulation and coding rate that can be used for sending data to the terminal device over the subband or wideband with the reported rank and the precoding matrix. CSI may also include measured reference signal received power (RSRP) and/or measured interference power at a terminal device. A CSI report may contain both a wideband CSI and multiple subband CSIs.

Neighboring network nodes serving different cells generally have the same uplink-downlink configuration in order to avoid severe interference between uplink and downlink transmissions. This could make it difficult in the network to dynamically switch between different uplink-downlink configurations in order to adapt to current uplink and downlink traffic patterns.

On the other hand, if neighboring network nodes are allowed to have different uplink-downlink configurations, there may be cases of severe interference. For example, a first terminal device on the cell edge of a first network node receiving downlink transmission from the first network node might be significantly interfered by a nearby second terminal device simultaneously transmitting in uplink to a second network node serving a neighboring cell with a different uplink-downlink configuration.

Hence, there is still a need for an improved handling of possible interference scenarios.

SUMMARY

An objective of embodiments herein is to enable efficient handling of possible interference scenarios.

This objective is generally solved by mechanisms performed by a network node for configuring resources for downlink CSI measurements and mechanisms performed by a terminal device for receiving configuration of resources for downlink CSI measurements.

According to a first aspect there is presented a method for configuring resources for downlink CSI measurements. The method is performed by a network node. The method comprises configuring, within a radio frame, the resources for downlink CSI measurements. The resources for downlink CSI measurements comprise at least two resources for interference measurements and at least one resource for channel measurements. Each resource for interference measurement is configured in its own slot within the radio frame. The method comprises transmitting configuration information. The configuration information specifies slot locations of the at least two resources for interference measurement and the at least one resource for channel quality measurement within the radio frame. The method comprises transmitting, within the radio frame, a reference signal in the at least one resource for channel measurements.

According to a second aspect there is presented a network node for configuring resources for downlink CSI measurements. The network node comprises processing circuitry. The processing circuitry is configured to cause the network node to configure, within a radio frame, the resources for downlink CSI measurements. The resources for downlink CSI measurements comprise at least two resources for interference measurements and at least one resource for channel quality measurements. Each resource for interference measurement is configured in its own slot within the radio frame. The processing circuitry is configured to cause the network node to transmit configuration information. The configuration information specifies slot locations of the at least two resources for interference measurement and the at least one resource for channel measurement within the radio frame. The processing circuitry is configured to cause the network node to transmit, within the radio frame, a reference signal in the at least one resource for channel measurements.

According to a third aspect there is presented a network node for configuring resources for downlink CSI measurements. The network node comprises a configure module configured to configure, within a radio frame, the resources for downlink CSI measurements. The resources for downlink CSI measurements comprise at least two resources for interference measurements and at least one resource for channel measurements. Each resource for interference measurement is configured in its own slot within the radio frame. The network node comprises a transmit module (210b) configured to transmit configuration information. The configuration information specifies slot locations of the at least two resources for interference measurement and the at least one resource for channel measurement within the radio frame. The network node comprises a transmit module configured to transmit, within the radio frame, a reference signal in the at least one resource for channel measurements.

According to a fourth aspect there is presented a computer program for configuring resources for downlink CSI measurements, the computer program comprises computer program code which, when run on processing circuitry of a network node, causes the network node to perform a method according to the first aspect.

According to a fifth aspect there is presented a method for receiving configuration of resources for downlink CSI measurements. The method is performed by a terminal device. The method comprises receiving, from a network node, the configuration of resources for downlink CSI measurements as configuration information. The resources for downlink CSI measurements comprise at least two resources for interference measurements and at least one resource for channel measurements. Each resource for interference measurement is configured in its own slot within the radio frame, and wherein the configuration information specifies slot locations of the at least two resources for interference measurement and the at least one resource for channel measurement within the radio frame. The method comprises receiving, within the radio frame, a reference signal in the at least one resource for channel measurements. The method comprises obtaining measurements on the resources for downlink CSI measurements. The method comprises transmitting at least one CSI report of the CSI measurements towards the network node.

According to a sixth aspect there is presented a terminal device for receiving configuration of resources for downlink CSI measurements. The terminal device comprises processing circuitry. The processing circuitry is configured to cause the terminal device to receive, from a network node, the configuration of resources for downlink CSI measurements as configuration information. The resources for downlink CSI measurements comprise at least two resources for interference measurements and at least one resource for channel measurements. Each resource for interference measurement is configured in its own slot within the radio frame, and wherein the configuration information specifies slot locations of the at least two resources for interference measurement and the at least one resource for channel measurement within the radio frame. The processing circuitry is configured to cause the terminal device to receive, within the radio frame, a reference signal in the at least one resource for channel measurements. The processing circuitry is configured to cause the terminal device to obtain measurements on the resources for downlink CSI measurements. The processing circuitry is configured to cause the terminal device to transmit at least one CSI report of the CSI measurements towards the network node.

According to a seventh aspect there is presented a terminal device for receiving configuration of resources for downlink CSI measurements. The terminal device comprises a receive module configured to receive, from a network node, the configuration of resources for downlink CSI measurements as configuration information. The resources for downlink CSI measurements comprise at least two resources for interference measurements and at least one resource for channel measurements. Each resource for interference measurement is configured in its own slot within the radio frame, and wherein the configuration information specifies slot locations of the at least two resources for interference measurement and the at least one resource for channel measurement within the radio frame. The terminal device comprises a receive module configured to receive, within the radio frame, a reference signal in the at least one resource for channel measurements. The terminal device comprises an obtain module configured to obtain measurements on the resources for downlink CSI measurements. The terminal device comprises a transit module configured to transmit, at least one CSI report of the CSI measurements towards the network node.

According to an eight aspect there is presented a computer program for receiving configuration of resources for downlink CSI measurements, the computer program comprising computer program code which, when run on processing circuitry of a terminal device, causes the terminal device to perform a method according to the fifth aspect.

According to a ninth aspect there is presented a computer program product comprising a computer program according to at least one of the fourth aspect and the eight aspect and a computer readable storage medium on which the computer program is stored. The computer readable storage medium could be a non-transitory computer readable storage medium.

Advantageously these methods, these network nodes, these terminal devices, and these computer programs enable efficient handling of possible interference scenarios.

Advantageously the configured reporting for CSI allows for accurate CSI reporting for different combinations of uplink/downlink transmissions. In turn, this allows for scheduling and link adaptation to be adapted to the current interference situation. This will result in improved throughput.

Advantageously the configured reporting for CSI allows for the network node to obtain knowledge of the interference situation through accurately reported CSI. In turn, this allows for relaxation of operator co-existence (such as where neighboring cells are served y network nodes of different network operators) and coordination requirements, since the impact of operator interference can be reduced by using accurate link adaptation.

Advantageously the configured reporting for CSI enables improved shorter delay for ultra-reliable low-latency communications (URLLC) services by enabling scheduling on resources where device-to-device TDD interference may occur to be avoided.

Advantageously the configured reporting for CSI allows interference measurements for several slots within one radio frame using only one CSI report. In turn, this increases the number of slots in a radio frame for which CSI can be reported and thus reduces the CSI overhead.

Advantageously the configured reporting for CSI allows filtering of interference measurement values and/or channel measurement to be applied by the terminal device. In turn, this improves the accuracy of the reported CSI.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which:

FIG. 1 is a schematic illustration of a configuration of resources in a radio frame for downlink CSI measurements;

FIGS. 7, 8, 9, 10, 11 are schematic illustrations of configurations of resources in a radio frame for downlink CSI measurements according to embodiments;

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 2:
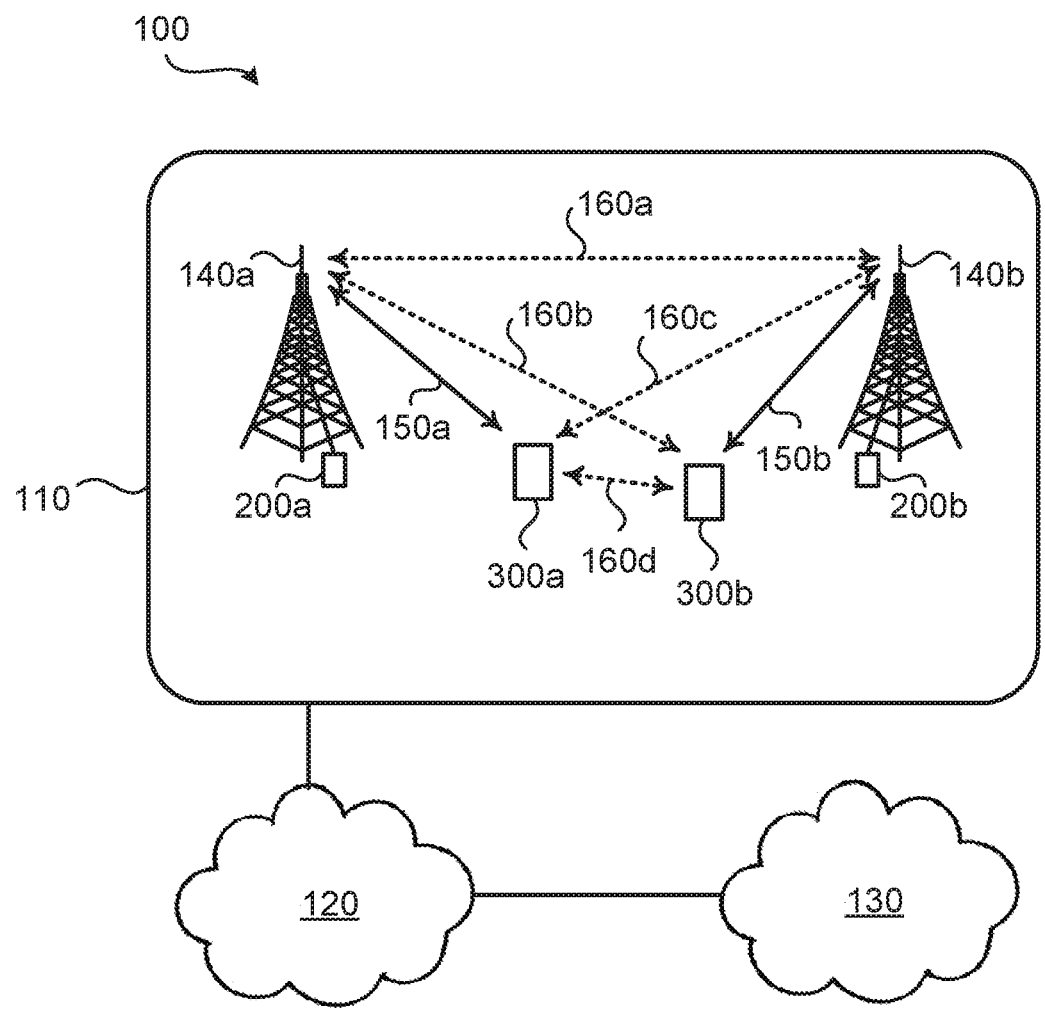
FIG. 2 is a schematic diagram illustrating a communication network according to embodiments.

FIG. 2 is a schematic diagram illustrating a communications network 100 where embodiments presented herein can be applied. The communications network 100 could be a fourth generation (4G) telecommunications network or a fifth (5G) telecommunications network and support any 3GPP telecommunications standard, where applicable.

The communications network 100 comprises network nodes 200a. 200b configured to provide network access to a respective set of terminal devices 300a, 300b in a radio access network 110. The radio access network 110 is operatively connected to a core network 120. The core network 120 is in turn operatively connected to a service network 130, such as the Internet. The terminal devices 300a, 300b are thereby enabled to, via the network nodes 200a, 200b, access services of, and exchange data with, the service network 130. The network nodes 200a, 200b comprise, are collocated with, are integrated with, or are in operational communications with, a respective transmission and reception point (TRP) 140a, 140b comprising radio equipment, including antennas, for wireless radio communications with the terminal devices 300a, 300b.

Examples of network nodes 200a, 200b are radio access network nodes, radio base stations, base transceiver stations, Node Bs, evolved Node Bs (eNB)s, g Node Bs (gNB)s, access points, and access nodes, and backhaul nodes. Examples of terminal devices 300a, 300b are wireless devices, mobile stations, mobile phones, handsets, wireless local loop phones, user equipment (UE), smartphones, laptop computers, tablet computers, network equipped sensors, network equipped vehicles, and so-called Internet of Things devices.

As schematically illustrated in FIG. 2, network node 200a communicates, via TRP 140a, with a served terminal device 300a over a wireless radio link 150a and network node 200b communicates, via TRP 140b, with a served terminal device 300b over a wireless radio link 150b. FIG. 2 at 160a, 160b, 160c, 160d further schematically illustrates possible radio propagation paths causing interference, thus defining different interference scenarios, that could occur due to properties of the physical radio propagation channel. At 160a is illustrated that transmission from one of the network nodes 200a, 200b could cause interference at the other one of the network nodes 200a, 200b. At 160b is illustrated that transmission from network node 200a could cause interference during reception at terminal device 300b, and vice versa. At 160c is illustrated that transmission from network node 200b could cause interference during reception at terminal device 300a, and vice versa. At 160d is illustrated that transmission from one of the terminal devices 300a, 300b could cause interference at the other one of the terminal devices 300a, 300b.

As noted above there is a need for an improved handling of possible interference scenarios.

In more detail, even though the physical radio propagation channel is changing slowly, interference may vary quickly in a slot-periodic pattern depending on the uplink-downlink configurations selected for neighboring cells. This is difficult and costly in terms of overhead to capture with the periodic or semi-persistent CSI, since the currently shortest periodicity for CSI-RS and CSI-IM reporting is 5 ms, while significant changes in interference may happen on slot level (such as in the order of 1 ms or even shorter, depending on the numerology used) or even on symbol level.

A-periodic CSI can be used to trigger a CSI measurement in a specific slot but it will result in a large downlink and CSI-RS overhead to capture different uplink-downlink configurations in neighbor cells. The worst-case scenario would be that CSI measurements and reporting thereof are triggered for a terminal device in every slot of its serving network node. Also, the terminal device might have a limited capability in terms of number of CSI report settings which might limit the ability to capture the uplink-downlink configuration and corresponding interference pattern of a network node in a neighboring cell.

Figure 3:
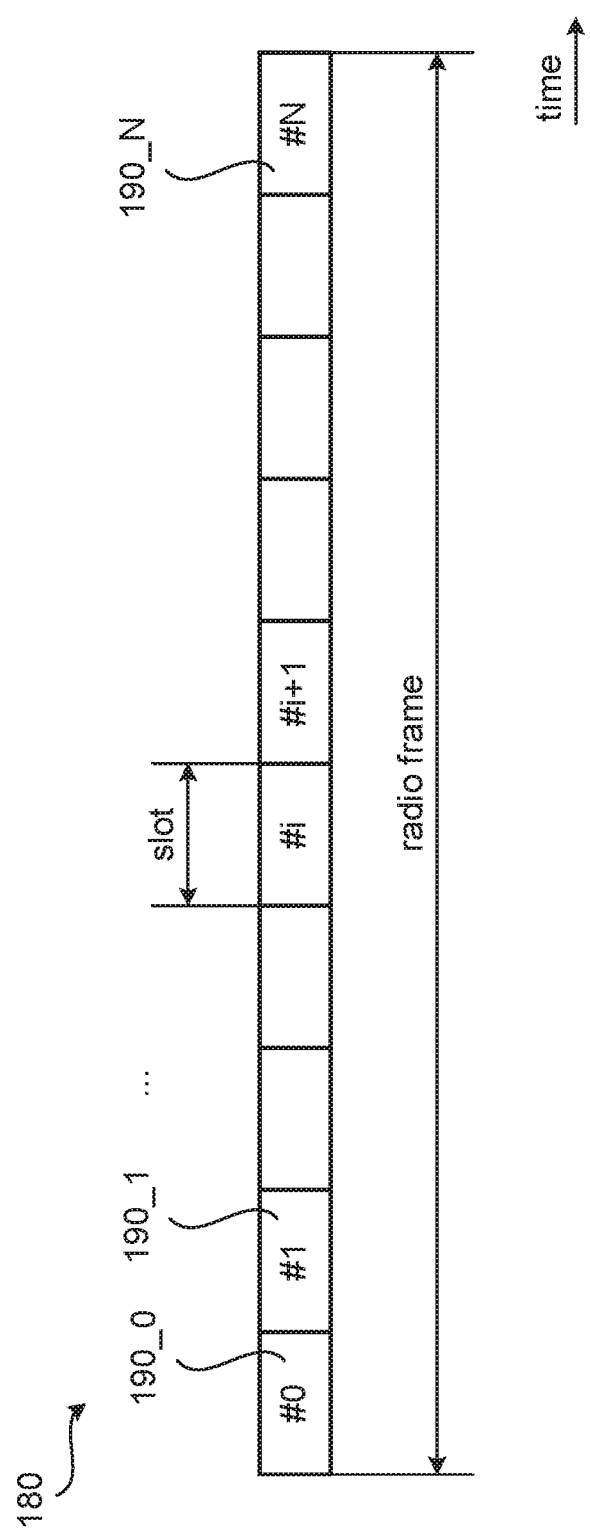
FIG. 3 is a schematic illustration of a radio frame according to embodiments.

FIG. 3 schematically illustrates a radio frame 180. The radio frame 180 is timewise composed of N+1 slots 190_0, 190_1, . . . , 190_N (also denoted slot #0, slot #1 . . . , slot #N).

Figures 4, 5:
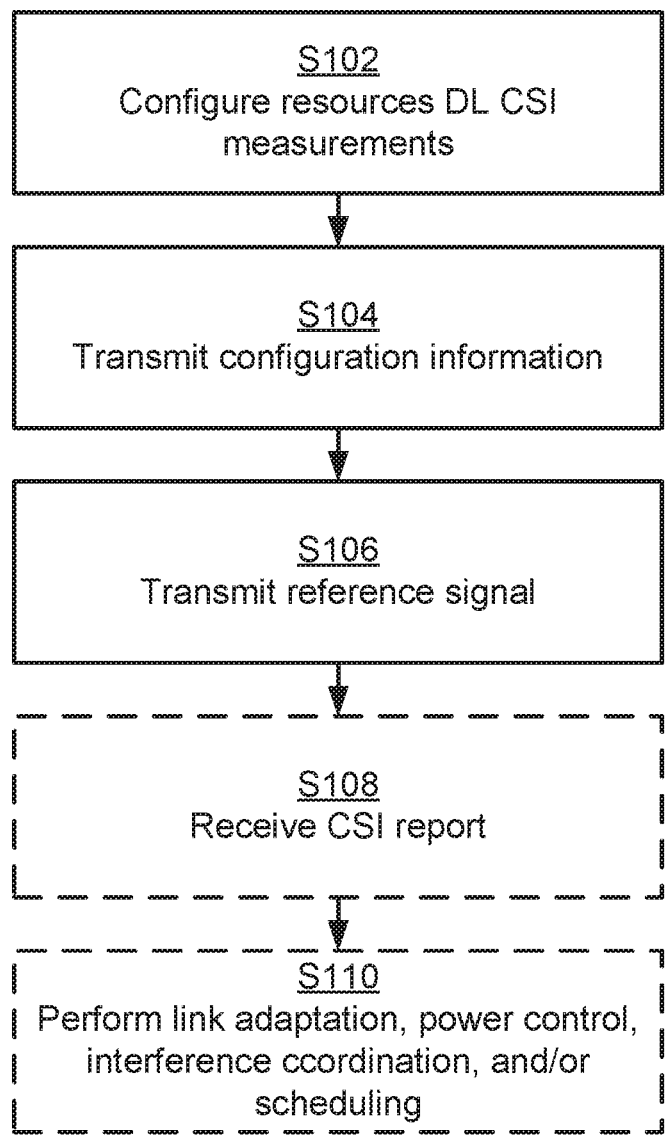
FIG. 4 is a schematic illustration of slots in a radio frame according to embodiments.
FIGS. 5 and 6 are flowcharts of methods according to embodiments.

Assume that the two network nodes 200a, 200b of FIG. 2 serve neighboring cells using different uplink-downlink configurations. As an example, consider a fifth generation telecommunications system, such as NR, with 15 kHz sub-carrier spacing and an LTE-like uplink-downlink configuration. FIG. 4 schematically illustrates slots in a radio frame, where 'D', 'U', and 'X' indicate downlink, uplink, and flexible slot, respectively. By using slot formats as in FIG. 4, all symbols in a slot can be configured to transmit in the same direction. Some other slot format is selected for the flexible slots to allow for switching between uplink and downlink.

With these uplink-downlink configurations, the two network nodes 200a, 200b will have different transmission directions in slot 7 and 8 and somewhat different also in slot 6 and 9. It is therefore likely that the interference situation is completely different in slots 0-5 compared to in slots 6-9. A terminal device 300b served by network node 200b might experience high interference in slots 6-9 from a nearby terminal device 300a transmitting in uplink and served by network node 200a.

To measure the different types of interference that might occur during one radio frame, terminal device 300b served by network node 200b should measure interference in one slot where network node 200a has a downlink slot and in one slot where network node 200a has an uplink slot. Network node 200b, which receives the CSI reports from terminal device 300b, might then, given the uplink-downlink configuration of the neighboring cell, configure terminal device 300b to estimate the channel quality in the remaining slots.

If the symbol level flexibility of an NR-like uplink-downlink configuration is utilized, interference situations might be detected on symbol level. For example, terminal device 300b served by network node 200b should measure interference in one symbol where network node 200a has a downlink symbol and in one symbol where network node 200a has an uplink symbol. As before, the network node 200b receiving the CSI reports might then, given the uplink-downlink configuration of the neighboring cell, configure terminal device 300b to estimate the channel quality in the remaining symbols of the radio frame.

By measuring interference and reporting CSI for several slots and/or symbols in a radio frame at terminal device 300b, the interference pattern caused by network node 200a having different uplink-downlink configurations may be captured. Similarly, the interference pattern caused by network node 200b to the cell served by network node 200a can also be captured by measuring interference and reporting CSI in several slots and/or symbols in a radio frame by terminal device 300a. Furthermore, if the physical radio propagation channel is slowly varying, there is a possibility that short-term interference variations due to the different uplink-downlink configurations can be captured even though CSI reports are not sent so often, e.g. once every few radio frames instead of every single radio frame.

In general terms, how the interference situation varies within a radio frame depends on the uplink-downlink configurations used by the network nodes of neighboring cells. Furthermore, within one cell the interference impact and interference slot-pattern will be different for each terminal device depending on its position in the cell and relatively the terminal devices in neighbor cells transmitting in the uplink. Each terminal device 300a, 300b might therefore be configured to measure individually per slot and/or symbol and classify the slots and/or symbols with interference on the same levels.

Particularly, the embodiments disclosed herein relate to mechanisms for configuring resources for downlink CSI measurements and receiving configuration of resources for downlink CSI measurements. In order to obtain such mechanisms there is provided a network node 200a, a method performed by the network node 200a, a computer program product comprising code, for example in the form of a computer program, that when run on processing circuitry of the network node 200a, causes the network node 200a to perform the method. In order to obtain such mechanisms there is further provided a terminal device 300a, a method performed by the terminal device 300a, and a computer program product comprising code, for example in the form of a computer program, that when run on processing circuitry of the terminal device 300a, causes the terminal device 300a to perform the method.

Reference is now made to FIG. 5 illustrating a method for configuring resources for downlink CSI measurements as performed by the network node 200a according to an embodiment.

S102: The network node 200a configures, within a radio frame 180, the resources for downlink CSI measurements. The resources for downlink CSI measurements comprise at least two resources for interference measurements and at least one resource for channel measurements. Each resource for interference measurement is configured in its own slot 190_0, 190_1, . . . , 190_N within the radio frame 180.

S104: The network node transmits configuration information. The configuration information specifies slot locations of the at least two resources for interference measurement and the at least one resource for channel measurement within said radio frame 180.

S106: The network node transmits S106, within the radio frame 180, a reference signal in the at least one resource for channel measurements.

By enabling the terminal device 300a to perform interference measurements on several slots within one radio frame and to estimate and report CSI for each slot this enables the difference in interference that might result from neighboring cells having different uplink-downlink configurations to be captured.

Embodiments relating to further details of configuring resources for downlink CSI measurements as performed by the network node 200a will now be disclosed.

There might be different kinds of resources for interference measurements. In some aspects each of the at least two resources for interference measurements represents a respective channel state information interference measurement (CSI-IM) resource.

There might be different kinds of reference signals. In some aspects the reference signal transmitted in the at least one resource for channel measurements is a channel state information reference signal (CSI-RS).

There could be different kinds of radio frames 180 and different composition of the radio frame 180 in terms of uplink and downlink slots. In some aspects the radio frame 180 is composed of downlink slots (denoted D), uplink slots (denoted U), and flexible slots (denoted X), and a respective one of the at least two resources for interference measurements is configured in a respective one of the downlink slots.

There could be further pieces of configuration information. In some aspects the configuration information further specifies how many CSI reports the terminal device 300a is to report to the network node 200a. In some aspects the configuration information further specifies how many of the measurements the terminal device 300a is to report to the network node 200a per radio frame 180.

In some aspects it is assumed that at least one terminal device 300a served by the network node 200a receives the configuration information and the reference signal as transmitted by the network node 200a. As will be further disclosed below the terminal device 300a then measures on the recourses and provides reporting thereof to the network node 200a. Particularly, according to an embodiment the network node 200a is configured to perform (optional) step S108:

S108: The network node 200a receives, from a terminal device 300a, at least one CSI report based on measurements performed by the terminal device 300a on the at least two resources for interference measurements and on the at least one resource for channel measurements.

Examples of different types of quantities of channel measurements that could be reported in the CSI report will be disclosed below.

There could be different uses by the network node 200a of the at least one CSI report. For example, the CSI report can be used for improved link adaptation (such as modulation and coding scheme (MCS) selection) but also for scheduling to avoid severely interfered slots in the time-frequency grid. The CSI report can further be used for power control and interference coordination. The scheduling can be combined with quality of service requirements such as avoiding symbols with identified probability for terminal-to-terminal interference for delay sensitive services. Particularly, according to an embodiment the network node 200a is configured to perform (optional) step S110:

S110: The network node 200a performs at least one of link adaptation, power control, interference coordination, and scheduling based on the CSI report.

In some aspects, and as will be further disclosed below, the network node 200a has access to information of which slots in the radio frame that, by a neighbouring network node 200b, are used for uplink and downlink, respectively. Particularly, in some aspects the configuration information is dependent on which slots in the radio frame that, by a neighbouring network node 200b, are used for uplink reception and which slots in the radio frame that, by the neighbouring network node 200b, are used for downlink transmission.

Figure 6:
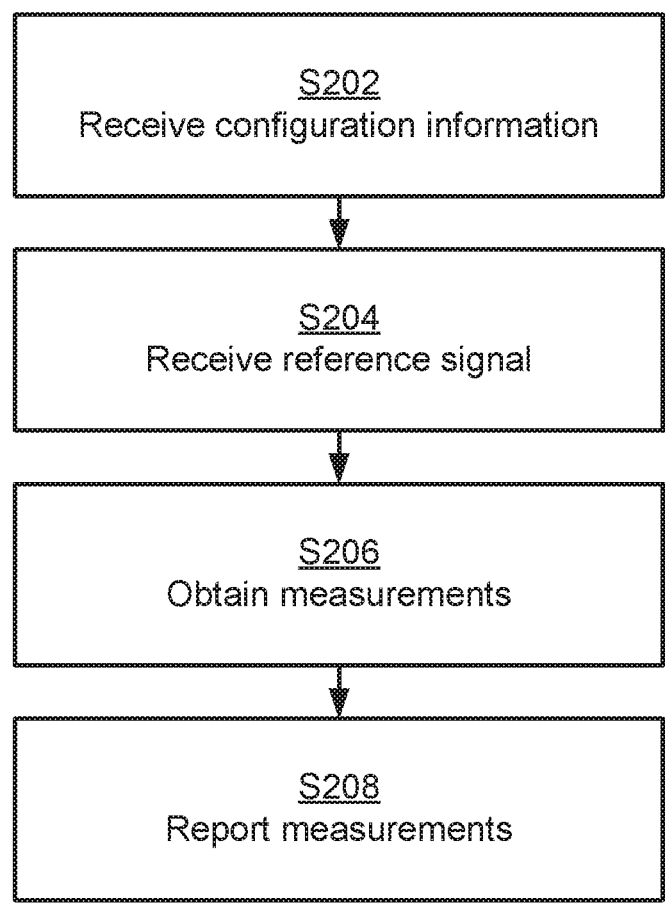

Reference is now made to FIG. 6 illustrating a method for receiving configuration of resources for downlink CSI measurements as performed by the terminal device 300a according to an embodiment.

As disclosed above, the network node 200a in step S104 transmits configuration information. It is here assumed that the terminal device 300a receives the configuration information. Hence, the terminal device 300a is configured to perform step S202:

S202: The terminal device 300a receives, from the network node 200a, the configuration of resources for downlink CSI measurements as configuration information. As disclosed above the resources for downlink CSI measurements comprise at least two resources for interference measurements and at least one resource for channel measurements. As further disclosed above each resource for interference measurement is configured in its own slot 190_0, 190_1 . . . 190_N within the radio frame 180. As disclosed above the configuration information specifies slot locations of the at least two resources for interference measurement and the at least one resource for channel measurement within the radio frame 180.

As disclosed above, the network node 200a in step S106 transmits a reference signal. It is here assumed that the terminal device 300a receives the reference signal. Hence, the terminal device 300a is configured to perform step S204:

S204: The terminal device 300a receives, within the radio frame 180, a reference signal in the at least one resource for channel measurements.

The terminal device 300a could then measure on the configured resources for downlink CSI measurements. Particularly, the terminal device 300a is configured to perform step S206:

S206: The terminal device 300a obtains measurements on the resources for downlink CSI measurements in order to estimate the CSI. For example, in order to do so the terminal device 300a could perform channel measurements based on the received reference signal, measure interferences on the configured at least two resources for interference measurements, and then estimate the CSI based on the channel measurements and interference measurements.

The estimated CSIs are then reported to the network node 200a in one or more CSI reports. In general terms, all estimated CSIs in the radio frame 180 might be combined into one or a few CSI reports to reduce the overhead.

Furthermore, the CSI may be reported in a sub-band like fashion, but in time instead of frequency. Particularly, the terminal device 300a is configured to perform step S208:

S208: The terminal device 300a transmits at least one CSI report of the CSI measurements towards the network node 200a.

Embodiments relating to further details of receiving configuration of resources for downlink CSI measurements as performed by the terminal device 300a will now be disclosed.

There could be different types of quantities of channel measurements that are reported in the CSI report. Examples include, but are not limited to, Pre-coding Matrix Indicator (PMI), Rank Indicator (RI), and Channel Quality Indicator (CQI). Further, CSI report might comprise a Reference Signal Received Power (RSRP) value, and/or a value of interference power.

As disclosed above, in some aspects each of the at least two resources for interference measurements represents a respective CSI-IM resource.

As disclosed above, in some aspects the reference signal is a CSI-RS and hence in some aspects the reference signal received in the at least one resource for channel measurements is a CSI-RS.

As disclosed above, in some aspects the radio frame 180 is composed of downlink slots (D), uplink slots (U), and flexible slots (X), and a respective one of the at least two resources for interference measurements is configured in a respective one of the downlink slots.

As disclosed above, in some aspects the configuration information further specifies how many CSI reports the terminal device 300a is to report to the network node 200a. The CSI might then in step S208 be reported according to this piece of configuration information.

As disclosed above, in some aspects the configuration information further specifies how many of CSI reports the terminal device 300a is to report to the network node 200a per radio frame 180. The CSI might then in step S208 be reported according to this piece of configuration information.

As disclosed above, in some aspects the configuration information is dependent on which slots in the radio frame that, by a neighbouring network node 200b, are used for uplink reception and which slots in the radio frame that, by the neighbouring network node 200b, are used for downlink transmission.

Five particular embodiments ("Embodiment 1", "Embodiment 2", "Embodiment 3", "Embodiment 4", and "Embodiment 5") for configuring resources for downlink CSI measurements and for receiving configuration of resources for downlink CSI measurements based on at least some of the above disclosed embodiments will now be disclosed in detail. Reference is made to FIGS. 7, 8, 9, 10, 11 that schematically illustrate configurations of resources in a radio frame for downlink CSI measurements according to each of these five embodiments.

Embodiment 1 relates to multiple CSI report configurations and will be disclosed with reference to FIG. 7.

In this embodiment one single resource for channel measurements is configured within the radio frame 180.

In this embodiment, from the perspective of the terminal device 300a one respective instance of the CSI report is transmitted for each of the at least two resources for interference measurements. Thus, in this embodiment, from the perspective of the network node 200a one respective instance of the CSI report is received for each of the at least two resources for interference measurements. Each instance of the CSI report comprises reporting of the CSI based on measurements on the one single resource for channel measurements and the measurements on a respective one of the at least two resources for interference measurements.

In more detail, for multi-slot CSI reporting for TDD operation, multiple CSI report configurations, each composed of at least a CSI-RS resource for channel measurement and a CSI-IM resource for interference measurement, are needed. The CSI-IM resource in each CSI report configuration can be associated with one interference pattern from neighbor cells. The illustrative example of FIG. 7 shows that M=6 CSI-IM resources are configured in slots k, k+5, k+6, . . . , k+9 with a periodicity of one or multiple radio frames. Each of the M different CSI report configurations is configured with the same CSI-RS resource, i.e. CSI-RS resource #1= . . . =CSI-RS resource #M. That is:

CSI report configuration #1: associated with {CSI-RS resource #1. CSI-IM resource #1}

CSI report configuration #2: associated with {CSI-RS resource #1. CSI-IM resource #2}

CSI report configuration #M: associated with {CSI-RS resource #1. CSI-IM resource #M}

The CSI reports can be periodic, semi-persistent, or a-periodically triggered.

Embodiment 2 relates to a single CSI report configuration with a single CSI-RS resource and multiple CSI-IM resources and will be disclosed with reference to FIG. 8.

In this embodiment, from the perspective of the terminal device 300a one single CSI report is transmitted for all the measurements as performed by the terminal device 300a on the at least two resources for interference measurements and on the at least one resource for channel measurements within the radio frame 180. Thus, in this embodiment, from the perspective of the network node 200a one single CSI report is received for all the measurements as performed by the terminal device 300a on the at least two resources for interference measurements and on the at least one resource for channel measurements within the radio frame 180.

In this embodiment the one single CSI report comprises as many values of the measurements on the at least two resources for interference measurements as there are resources for interference measurements within said radio frame 180. As an example, Each CSI report contains at least one of an RI, a wideband CQI, a wideband PMI, multiple subband CQIs, and/or multiple subband PMIs.

In this embodiment, to reduce overhead caused by multiple CSI reports for one radio frame, one CSI report is configured with one CSI-RS resource and multiple CSI-IM resources. Each CSI-IM resource is associated with one interference pattern from neighbor cells. That is:

CSI report configuration #1: associated with {CSI-RS resource #1, CSI-IM resource #1, #2, . . . , #M}

There are several alternatives for how the CSI report could be constructed in this case. Three examples thereof will now be disclosed.

According to a first example, the CSI report comprises an average of the interference measured on CSI-IM resource #1 to #M, as described further with reference to embodiment 4 and embodiment 5.

In general terms, the minimum slots in which interference measurements are needed in order to capture all combinations of uplink-downlink interference from neighboring cells are denoted characteristic slots. How to identify characteristic slots will be disclosed below. According to a second example, in case of unknown characteristic slots, the terminal device 300 might be configured to identify a number of slots (or equivalently CSI-IM resources) with interference on the same level and might for each such number of slots report a single CSI. One example is when there is one terminal device 300b served a network node 200b of a neighboring cell close to the terminal device 300a and transmitting in the uplink in the downlink slots of the terminal device 300a. This could result in two interference levels for the terminal device 300a; slots without interference caused by other terminal devices 300b and slots with possible interference caused by other terminal devices 300b, where for the second a list of severely interfered slots could be reported.

For instance, the terminal device 300a might be configured to report two sets of CSI parameters, corresponding to a first and a second subset of slots (or equivalently CSI-IM resources). The terminal device 300a might further be configured to feed back an indicator bit for each of the CSI-IM resources, the indicator bit indicating if the CSI-IM resource belongs to the first subset or the second subset. That is, the terminal device 300a might be configured to group the slots into two groups based on the measured interference level and conveys this information to the network node 200a in form of the indicator bits. In case where the UL/DL slot configuration between network nodes 200a, 200b of adjacent cells are dynamically updated in an uncoordinated fashion, this feedback can provide useful information to the network node 200a regarding what the UL/DL slot configuration of the network nodes 200b of the neighboring cells currently is, without any need for inter-network node coordination. In some aspects the terminal device 300a is configured with how many subsets of slots it is to report CSI for, and for each such subset reports a separate set of CSI parameters. For each slot or CSI-IM resource, an indication of which subset the slot or CSI-IM resource belongs to is then reported.

According to a third example, in case the characteristic slots are known by the network node 200a, the terminal device 300a might include a channel measurement for each slot configured with CSI-IM.

To reduce the number of bits needed to report the channel measurements for each subset of slots, the channel measurements can be reported in a differential manner. The channel measurements in one slot, or a subset of slots, are then used as reference to the channel measurements and the channel measurements for the remaining slots or subsets, of slots, are reported as the difference compared to the reference to the channel measurements. As an illustrative example, CQI calculated based on averaged interference measurements over all slots configured with CSI-IM in a radio frame can be used as a reference CQI and is reported together with the slot specific CQIs for the configured slots. In other such examples, only a single RI and PMI is reported (where the PMI might comprise indication of multiple precoder matrices in case of subband PMI reporting), where the RI/PMI selection is made assuming a reference slot or CSI-IM resource, since RI selection and hence also PMI selection depends on the interference level. A separate CQI is then reported per slot, CSI-IM resource or characteristic slot, where the CQIs are conditioned on the single reported RI and PMI.

Embodiment 3 relates to a single CSI report configuration with multiple CSI-RS resources and multiple CSI-IM resources and will be disclosed with reference to FIG. 9.

In this embodiment at least two resources for channel measurements are configured within the radio frame 180.

According to this embodiment the terminal device 300a is configured with a CSI-RS resource set of N (>1) CSI-RS resources and a CSI-IM resource set of M CSI-IM resources. That is:

CSI-RS resource set: {CSI-RS resource #1, . . . , CSI-RS resource #N}

CSI-IM resource set: {CSI-IM resource #1, . . . , CSI-IM resource #M}

Either M is equal to N. or M is different from N.

According to an example, when there are as many resources for channel measurements as there are resources for interference measurements, one resource for channel measurements and one resource for interference measurements are pair-wise configured within the radio frame 180 where the resources are configured.

The terminal device 300a is indicated by the report quantity "multiple RI-PMI-CQI" in the CSI report configuration to measure and report CSI based on each resource pair {CSI-RS resource #m, CSI-IM resource #m}. In this case, only a single CSI-RS report configuration is needed. The CSI-RS resources in the CSI-RS resource set can be the same, i.e. CSI-RS resource #1= . . . =CSI-RS resource #N. The CSI report comprises N CSI values, each corresponding to one CSI-RS and CSI-IM resource pair in the resource sets. The CSI reporting can be either periodic, semi-persistent or a-periodic.

Embodiment 4 relates to filtering over CSI-IM resources with different uplink/downlink (UL/DL) characteristics and will be disclosed with reference to FIG. 10.

In this embodiment one single CSI report comprises one single value of the measurements representative of all the measurements on the at least two resources for interference measurements within said radio frame 180.

In more detail, in this embodiment, interferences might be measured by the terminal device 300a on all downlink slots in the radio frame and CSI may be estimated and reported based on a filtered, or averaged, interference over the measured CSI-IMs. Hence, according to an example the one single value is an average of all the measurements on the at least two resources for interference measurements within said radio frame 180, and according to another example the one single value is a filtered version of all the measurements on the at least two resources for interference measurements within said radio frame 180.

In the illustrative example of FIG. 10 a single CSI is reported in each radio frame. One example is to implement the filtering with an infinite impulse response (IIR) filter with a forgetting factor, or a sliding window. Since the slots within a single radio frame might correspond to different UL/DL characteristics, the mean interference might be calculated with interference measurements from each slot having the same weight, thereby resulting in linear filtering. One advantage with this embodiment is that the interference is averaged over different UL/DL characteristics, thus yielding a better estimate than is achieved by, for example, measuring CSI-IM only in one slot (say, slot k) and using it for all slots within the radio frame independent of UL/DL configurations.

The network node 200a might therefore configure a CSI report configuration with a CSI-RS resource set with a single CSI-RS resource for channel measurement and a CSI-IM resource set with multiple CSI-IM resources. Such a configuration indirectly indicates to the terminal device 300a that the measured interferences over the multiple CSI-IM resources shall be filtered or averaged for CSI estimation. In this case, a single CSI value is thus reported.

Embodiment 5 relates to filtering over CSI-IM resources with same UL/DL characteristic and will be disclosed with reference to FIG. 11.

In this embodiment there could be at least three resources for interference measurements within the radio frame 180, but the CSI report comprises more than one measurement value (for example, only two measurement values) but less number of measurement values than the total number of resources for interference measurements within the radio frame 180. Each of these more than one measurement values might be representative of interference measurements in slots 190_0, 190_1, . . . , 190_N of respective interference characteristics.

In more detail, in this embodiment, interference is measured in all or a subset of the downlink slots in a radio frame. One illustrative example is given in FIG. 11. The interference measurements corresponding to slots with the same characteristics are however filtered (e.g. averaged) and used as one interference measurement. In the illustrative example of FIG. 11 it is assumed that slot k has unique UL/DL characteristics, while slots k+5, k+6 and k+7 share the same characteristics. Slots k+8 and k+9 also share UL/DL characteristics. By filtering CSI-IM measurements from slots with the same UL/DL characteristics separately and combining (e.g. through filtering) only interference measurements from slots with the same characteristics into one CSI report, the advantages of filtering can be achieved at the same time as the interference characteristics for different UL/DL configurations is captured.

The network node 200a and the terminal device 300a might therefore need to share information as to which slots in the radio frame have the same characteristics. If the terminal device 300a groups the slots according to interference levels, the terminal device 300 might inform the network node 200b about the groups of slots. On the other hand, if the network node 200a has access to information as to what uplink-downlink configurations are used by network nodes 200b of neighboring cells and is configured to, using this information and its own used uplink-downlink configurations, identify groups of slots with the same characteristics, the network node 200a could be configured to notify the terminal device 300a of these identified groups of slots. The signaling may be achieved by configuring multiple CSI report configurations, each comprising a CSI-RS resource set with a single CSI-RS resource for channel measurement and a CSI-IM resource set with one or multiple CSI-IM resources for interference measurement, where the interferences measurement on the CSI-IM resources within a CSI-IM resource set are filtered or averaged for CSI estimation.

Aspects of selecting the characteristic slots will now be disclosed.

In general terms, as will be disclosed next, if interference is measured in all downlink slots within the radio frame, characteristic slots can be identified either by the network node 200a or by the terminal device 300a.

In some aspects the network node 200a requests, in case it does not have access to any information about the uplink-downlink configurations used by network nodes 200b of neighboring cells, the terminal device 300a to measure interference in all downlink slots within a radio frame. The terminal device 300a might then be configured to consider all interference measurements from one radio frame and group them according to interference levels. One slot from each such group might then define a characteristic slot. Alternatively, the terminal device 300a might be configured to initially send separate CSI reports for each downlink slots in the radio frame. The network node 200a receiving theses separate CSI reports thereby receives information needed to perform grouping of slots according to interference levels and identify one slot for each group as the characteristic slot.

In some aspects, in order to limit the CSI reporting (i.e., the amount of CSI reports sent by the terminal device 300a), the initial identification of characteristic slots is performed by the network node 200a by initially receiving CSI reports from its served terminal devices 300a for a period of time during which the impact on the interference of the UL/DL configurations of network nodes 200b of neighboring and/or adjacent cells impact is estimated. If any geographical or radio position information of the served terminal devices 300a is available such information can be correlated with the received CSI reports in order to capture differences of the interference within the cell served by the network node 200a.

In some aspects the network node 200a has access to information about the uplink-downlink configurations used by network nodes 200b of neighboring cells. The network node 200a can thereby directly identify the characteristics slots.

Combinations of the above embodiments 1-5 are also possible.

Figure 12:
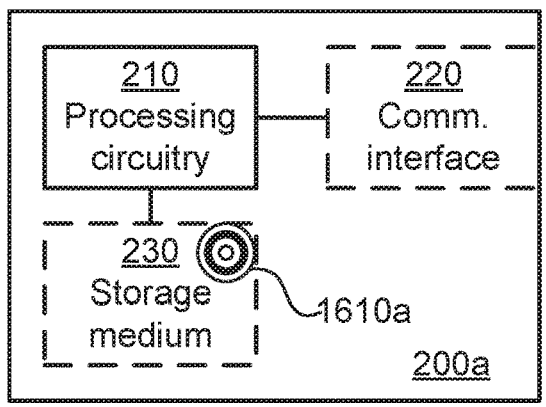
FIG. 12 is a schematic diagram showing functional units of a network node according to an embodiment.

FIG. 12 schematically illustrates, in terms of a number of functional units, the components of a network node 200a according to an embodiment.

Processing circuitry 210 is provided using any combination of one or more of a suitable central processing unit (CPU), multiprocessor, microcontroller, digital signal processor (DSP), etc., capable of executing software instructions stored in a computer program product 1610a (as in FIG. 16). e.g. In the form of a storage medium 230. The processing circuitry 210 may further be provided as at least one application specific integrated circuit (ASIC), or field programmable gate array (FPGA).

Particularly, the processing circuitry 210 is configured to cause the network node 200a to perform a set of operations, or steps, as disclosed above. For example, the storage medium 230 may store the set of operations, and the processing circuitry 210 may be configured to retrieve the set of operations from the storage medium 230 to cause the network node 200a to perform the set of operations. The set of operations may be provided as a set of executable instructions. Thus the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

The network node 200a may further comprise a communications interface 220 for communications with other entities, nodes, functions, and devices of the communication networks 100. As such the communications interface 220 may comprise one or more transmitters and receivers, comprising analogue and digital components.

The processing circuitry 210 controls the general operation of the network node 200a e.g. by sending data and control signals to the communications interface 220 and the storage medium 230, by receiving data and reports from the communications interface 220, and by retrieving data and instructions from the storage medium 230. Other components, as well as the related functionality, of the network node 200a are omitted in order not to obscure the concepts presented herein.

Figure 13:
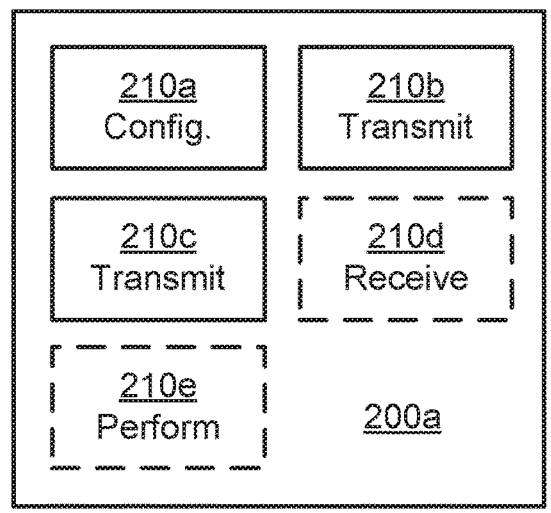
FIG. 13 is a schematic diagram showing functional modules of a network node according to an embodiment.

FIG. 13 schematically illustrates, in terms of a number of functional modules, the components of a network node 200a according to an embodiment. The network node 200a of FIG. 13 comprises a number of functional modules; a configure module 210a configured to perform step S102, a first transmit module 210b configured to perform step S104, and a second transmit module 210c configured to perform step S106. The network node 200a of FIG. 13 may further comprise a number of optional functional modules, such as any of a receive module 210d configured to perform step S108, and a perform module 210e configured to perform step S110. In general terms, each functional module 210a-210e may be implemented in hardware or in software. Preferably, one or more or all functional modules 210a-210e may be implemented by the processing circuitry 210, possibly in cooperation with the communications interface 220 and/or the storage medium 230. The processing circuitry 210 may thus be arranged to from the storage medium 230 fetch instructions as provided by a functional module 210a-210e and to execute these instructions, thereby performing any steps of the network node 200a as disclosed herein.

Examples of network nodes 200a have been given above. Further in this respect, the network node 200a may be provided as a standalone device or as a part of at least one further device. For example, the network node 200a may be provided in a node of the radio access network 110 or in a node of the core network 120. Alternatively, functionality of the network node 200a may be distributed between at least two devices, or nodes. These at least two nodes, or devices, may either be part of the same network part (such as the radio access network 110 or the core network 120) or may be spread between at least two such network parts. In general terms, instructions that are required to be performed in real time may be performed in a device, or node, operatively closer to the cell than instructions that are not required to be performed in real time. In this respect, at least part of the network node 200a may reside in the radio access network 110, such collocated with the TRP 140a, for cases when embodiments as disclosed herein are performed in real time.

Thus, a first portion of the instructions performed by the network node 200a may be executed in a first device, and a second portion of the of the instructions performed by the network node 200a may be executed in a second device; the herein disclosed embodiments are not limited to any particular number of devices on which the instructions performed by the network node 200a may be executed. Hence, the methods according to the herein disclosed embodiments are suitable to be performed by a network node 200a residing in a cloud computational environment. Therefore, although a single processing circuitry 210 is illustrated in FIG. 12 the processing circuitry 210 may be distributed among a plurality of devices, or nodes. The same applies to the functional modules 210a-210e of FIG. 13 and the computer program 1620a of FIG. 16.

Figure 14:
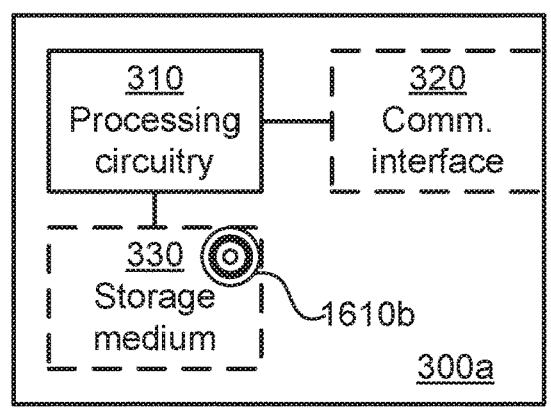
FIG. 14 is a schematic diagram showing functional units of a terminal device according to an embodiment.

FIG. 14 schematically illustrates, in terms of a number of functional units, the components of a terminal device 300a according to an embodiment. Processing circuitry 310 is provided using any combination of one or more of a suitable central processing unit (CPU), multiprocessor, microcontroller, digital signal processor (DSP), etc., capable of executing software instructions stored in a computer program product 1610b (as in FIG. 16), e.g. in the form of a storage medium 330. The processing circuitry 310 may further be provided as at least one application specific integrated circuit (ASIC), or field programmable gate array (FPGA).

Particularly, the processing circuitry 310 is configured to cause the terminal device 300a to perform a set of operations, or steps, as disclosed above. For example, the storage medium 330 may store the set of operations, and the processing circuitry 310 may be configured to retrieve the set of operations from the storage medium 330 to cause the terminal device 300a to perform the set of operations. The set of operations may be provided as a set of executable instructions. Thus the processing circuitry 310 is thereby arranged to execute methods as herein disclosed.

The storage medium 330 may also comprise persistent storage, which, for example, can be any single one or combination of magnetic memory, optical memory, solid state memory or even remotely mounted memory.

The terminal device 300a may further comprise a communications interface 320 for communications with other entities, nodes, functions, and devices of the communication networks 100. As such the communications interface 320 may comprise one or more transmitters and receivers, comprising analogue and digital components.

The processing circuitry 310 controls the general operation of the terminal device 300a e.g. by sending data and control signals to the communications interface 320 and the storage medium 330, by receiving data and reports from the communications interface 320, and by retrieving data and instructions from the storage medium 330. Other components, as well as the related functionality, of the terminal device 300a are omitted in order not to obscure the concepts presented herein.

Figure 15:
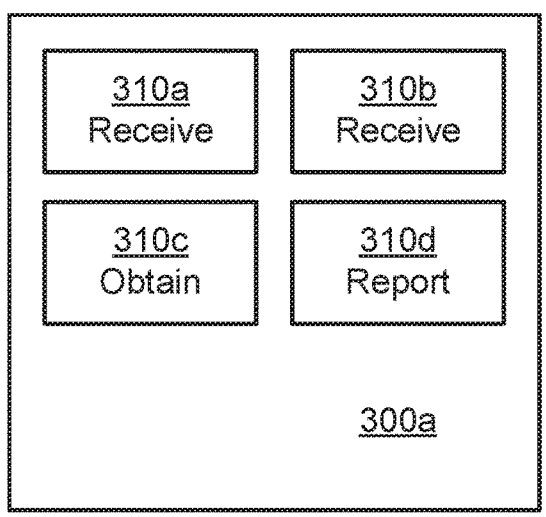
FIG. 15 is a schematic diagram showing functional modules of a terminal device according to an embodiment.

FIG. 15 schematically illustrates, in terms of a number of functional modules, the components of a terminal device 300a according to an embodiment. The terminal device 300a of FIG. 15 comprises a number of functional modules; a first receive module 310a configured to perform step S202, a second receive module 310b configured to perform step S204, an obtain module 310c configured to perform step S206, and a report module 310d configured to perform step S208. In general terms, each functional module 310a-310d may be implemented in hardware or in software. Preferably, one or more or all functional modules 310a-310d may be implemented by the processing circuitry 310, possibly in cooperation with the communications interface 320 and/or the storage medium 330. The processing circuitry 310 may thus be arranged to from the storage medium 330 fetch instructions as provided by a functional module 310a-310d and to execute these instructions, thereby performing any steps of the terminal device 300a as disclosed herein.

Examples of terminal devices 300a have been given above.

Figure 16:
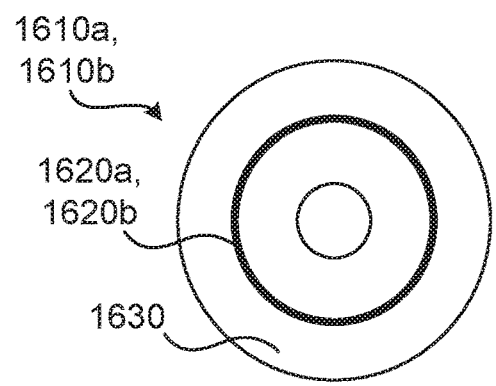
FIG. 16 shows one example of a computer program product comprising computer readable means according to an embodiment.

FIG. 16 shows one example of a computer program product 1610a, 1610b comprising computer readable means 1630. On this computer readable means 1630, a computer program 1620a can be stored, which computer program 1620a can cause the processing circuitry 210 and thereto operatively coupled entities and devices, such as the communications interface 220 and the storage medium 230, to execute methods according to embodiments described herein. The computer program 1620a and/or computer program product 1610a may thus provide means for performing any steps of the network node 200a as herein disclosed. On this computer readable means 1630, a computer program 1620b can be stored, which computer program 1620b can cause the processing circuitry 310 and thereto operatively coupled entities and devices, such as the communications interface 320 and the storage medium 330, to execute methods according to embodiments described herein. The computer program 1620b and/or computer program product 1610b may thus provide means for performing any steps of the terminal device 300a as herein disclosed.

In the example of FIG. 16, the computer program product 1610a, 1610b is illustrated as an optical disc, such as a CD (compact disc) or a DVD (digital versatile disc) or a Blu-Ray disc. The computer program product 1610a, 1610b could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1620a, 1620b is here schematically shown as a track on the depicted optical disk, the computer program 1620a, 1620b can be stored in any way which is suitable for the computer program product 1610a, 1610b.

Figure 17:
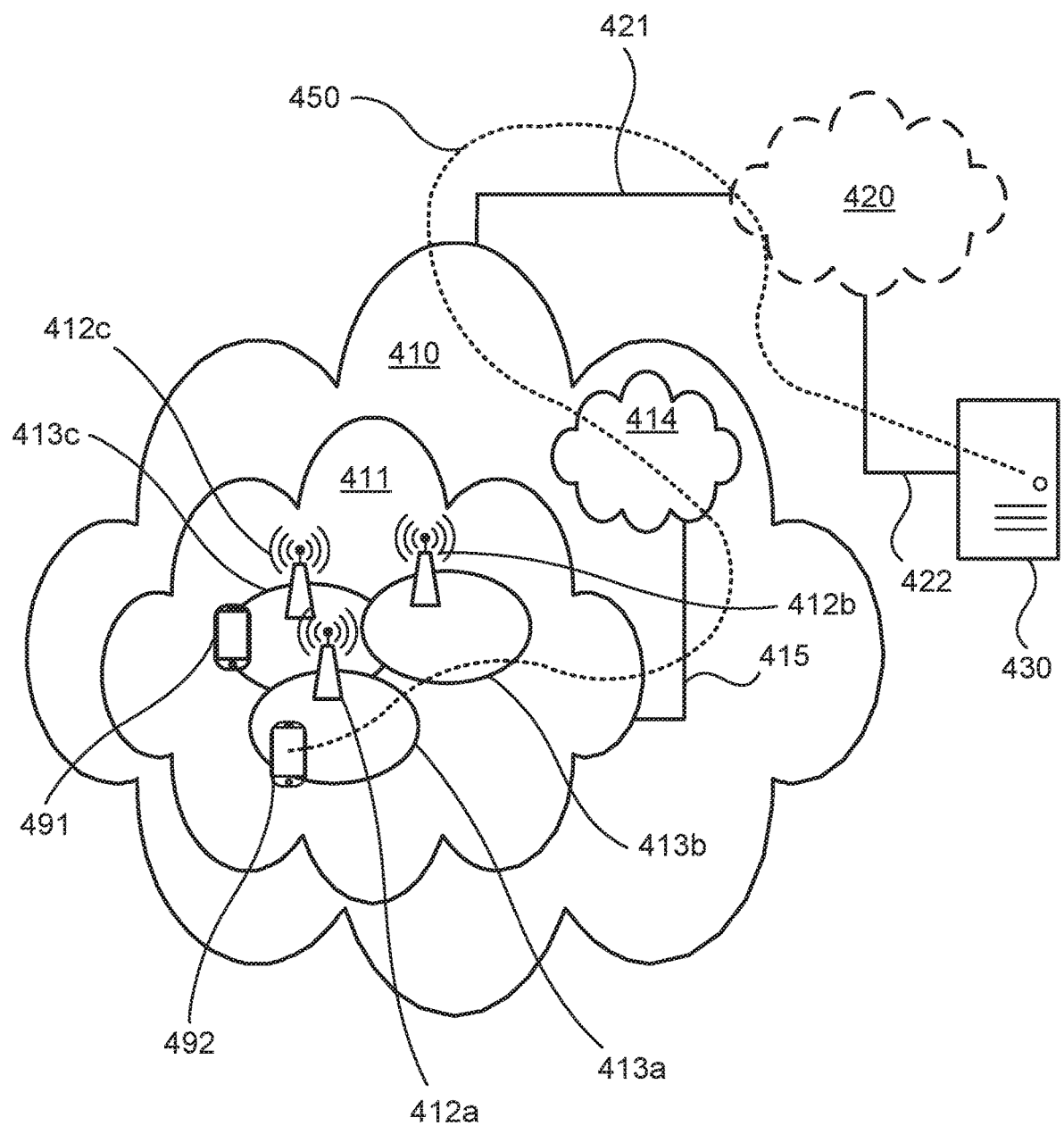
FIG. 17 is a schematic diagram illustrating a telecommunication network connected via an intermediate network to a host computer in accordance with some embodiments.

FIG. 17 is a schematic diagram illustrating a telecommunication network connected via an intermediate network to a host computer in accordance with some embodiments. In accordance with an embodiment, a communication system includes telecommunication network 410, such as a 3GPP-type cellular network, which comprises access network 411, such as radio access network 110 in FIG. 2, and core network 414, such as core network 120 in FIG. 2. Access network 411 comprises a plurality of network nodes 412a, 412b, 412c, such as NBs, eNBs, gNBs (each corresponding to the network nodes 200a, 200b of FIG. 2) or other types of wireless access points, each defining a corresponding coverage area, or cell, 413a, 413b, 413c. Each network node 412a, 412b, 412c is connectable to core network 414 over a wired or wireless connection 415. A first terminal device 491 located in coverage area 413c is configured to wirelessly connect to, or be paged by, the corresponding network node 412c. A second terminal device 492 in coverage area 413a is wirelessly connectable to the corresponding network node 412a. While a plurality of terminal devices 491, 492 are illustrated in this example, the disclosed embodiments are equally applicable to a situation where a sole terminal device is in the coverage area or where a sole terminal device is connecting to the corresponding network node 412. The terminal devices 491, 492 correspond to the terminal devices 300a. 300b of FIG. 2.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider, or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more subnetworks (not shown).

The communication system of FIG. 17 as a whole enables connectivity between the connected terminal devices 491, 492 and host computer 430. The connectivity may be described as an over-the-top (OTT) connection 450. Host computer 430 and the connected terminal devices 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, network node 412 may not or need not be informed about the past routing of an incoming downlink communication with data originating from host computer 430 to be forwarded (e.g., handed over) to a connected terminal device 491. Similarly, network node 412 need not be aware of the future routing of an outgoing uplink communication originating from the terminal device 491 towards the host computer 430.

Figure 18:
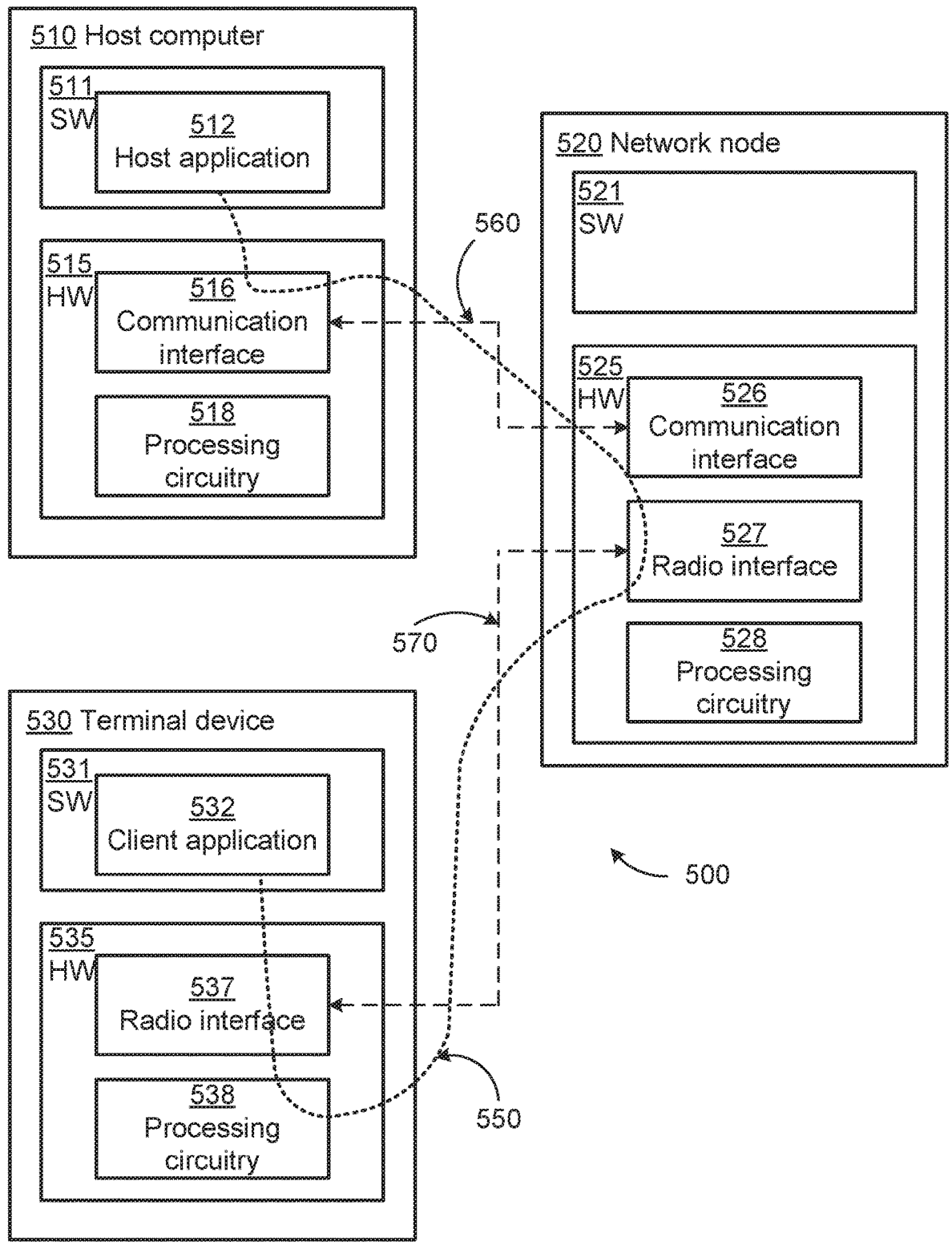
FIG. 18 is a schematic diagram illustrating host computer communicating via a network node with a terminal device over a partially wireless connection in accordance with some embodiments.

FIG. 18 is a schematic diagram illustrating host computer communicating via a network node with a terminal device over a partially wireless connection in accordance with some embodiments. Example implementations, in accordance with an embodiment, of the terminal device, network node and host computer discussed in the preceding paragraphs will now be described with reference to FIG. 18. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as terminal device 530 connecting via OTT connection 550 terminating at terminal device 530 and host computer 510. The terminal device 530 corresponds to the terminal devices 300a, 300b of FIGS. 2, 14, 15. In providing the service to the remote user, host application 512 may provide user data which is transmitted using OTT connection 550.

Communication system 500 further includes network node 520 provided in a telecommunication system and comprising hardware 525 enabling it to communicate with host computer 510 and with terminal device 530. The network node 520 corresponds to the network nodes 200a, 200b of FIGS. 2, 12.13. Hardware 525 may include communication interface 526 for setting up and maintaining a wired or wireless connection with an interface of a different communication device of communication system 500, as well as radio interface 527 for setting up and maintaining at least wireless connection 570 with terminal device 530 located in a coverage area (not shown in FIG. 18) served by network node 520. Communication interface 526 may be configured to facilitate connection 560 to host computer 510. Connection 560 may be direct or it may pass through a core network (not shown in FIG. 18) of the telecommunication system and/or through one or more intermediate networks outside the telecommunication system. In the embodiment shown, hardware 525 of network node 520 further includes processing circuitry 528, which may comprise one or more programmable processors, application-specific integrated circuits, field programmable gate arrays or combinations of these (not shown) adapted to execute instructions. Network node 520 further has software 521 stored internally or accessible via an external connection.

Communication system 500 further includes terminal device 530 already referred to. Its hardware 535 may include radio interface 537 configured to set up and maintain wireless connection 570 with a network node serving a coverage area in which terminal device 530 is currently located. Hardware 535 of terminal device 530 further includes processing circuitry 538, which may comprise one or more programmable processors, application-specific integrated circuits, field programmable gate arrays or combinations of these (not shown) adapted to execute instructions. Terminal device 530 further comprises software 531, which is stored in or accessible by terminal device 530 and executable by processing circuitry 538. Software 531 includes client application 532. Client application 532 may be operable to provide a service to a human or non-human user via terminal device 530, with the support of host computer 510. In host computer 510, an executing host application 512 may communicate with the executing client application 532 via OTT connection 550 terminating at terminal device 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

It is noted that host computer 510, network node 520 and terminal device 530 illustrated in FIG. 18 may be similar or identical to host computer 430, one of network nodes 412a, 412b, 412c and one of terminal devices 491, 492 of FIG. 17, respectively. This is to say, the inner workings of these entities may be as shown in FIG. 18 and independently, the surrounding network topology may be that of FIG. 17.

In FIG. 18, OTT connection 550 has been drawn abstractly to illustrate the communication between host computer 510 and terminal device 530 via network node 520, without explicit reference to any intermediary devices and the precise routing of messages via these devices. Network infrastructure may determine the routing, which it may be configured to hide from terminal device 530 or from the service provider operating host computer 510, or both. While OTT connection 550 is active, the network infrastructure may further take decisions by which it dynamically changes the routing (e.g., on the basis of load balancing consideration or reconfiguration of the network).

Wireless connection 570 between terminal device 530 and network node 520 is in accordance with the teachings of the embodiments described throughout this disclosure. One or more of the various embodiments improve the performance of OTT services provided to terminal device 530 using OTT connection 550, in which wireless connection 570 forms the last segment. More precisely, the teachings of these embodiments may reduce interference, due to improved classification ability of airborne terminal devices which can generate significant interference.

A measurement procedure may be provided for the purpose of monitoring data rate, latency and other factors on which the one or more embodiments improve. There may further be an optional network functionality for reconfiguring OTT connection 550 between host computer 510 and terminal device 530, in response to variations in the measurement results. The measurement procedure and/or the network functionality for reconfiguring OTT connection 550 may be implemented in software 511 and hardware 515 of host computer 510 or in software 531 and hardware 535 of terminal device 530, or both. In embodiments, sensors (not shown) may be deployed in or in association with communication devices through which OTT connection 550 passes: the sensors may participate in the measurement procedure by supplying values of the monitored quantities exemplified above, or supplying values of other physical quantities from which software 511, 531 may compute or estimate the monitored quantities. The reconfiguring of OTT connection 550 may include message format, retransmission settings, preferred routing etc.; the reconfiguring need not affect network node 520, and it may be unknown or imperceptible to network node 520. Such procedures and functionalities may be known and practiced in the art. In certain embodiments, measurements may involve proprietary terminal device signaling facilitating host computer's 510 measurements of throughput, propagation times, latency and the like. The measurements may be implemented in that software 511 and 531 causes messages to be transmitted, in particular empty or 'dummy' messages, using OTT connection 550 while it monitors propagation times, errors etc.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for configuring resources for downlink channel state information (CSI) measurements, the method comprising a network node:
configuring, within a radio frame, the resources for downlink CSI measurements, wherein the resources for downlink CSI measurements comprise at least two resources for interference measurements and at least one resource for channel measurements, and wherein each resource for interference measurement is configured in its own slot within the radio frame;
transmitting configuration information, wherein the configuration information specifies slot locations of the at least two resources for interference measurement and the at least one resource for channel measurement within the radio frame and configuring a CSI report configuration with a CSI reference signal (CSI-RS) resource set with a single CSI-RS resource for channel measurement and a CSI interference measurement (CSI-IM) resource set with multiple CSI-IM resources wherein the configuration indirectly indicates to a terminal device that the measured interferences in the multiple CSI-IM resources shall be filtered or averaged over the multiple resources, for CSI estimation; and transmitting, within the radio frame, a reference signal in the at least one resource for channel measurements.

2. The method of claim 1:
wherein the radio frame is composed of downlink slots, uplink slots, and flexible slots; and
wherein a respective one of the at least two resources for interference measurements is configured in a respective one of the downlink slots.

3. The method of claim 1, further comprising receiving, from a terminal device, at least one CSI report based on measurements performed by the terminal device on the at least two resources for interference measurements and on the at least one resource for channel measurements.

4. The method of claim 1, further comprising performing link adaptation, power control, interference coordination, and/or scheduling based on the CSI report.

5. The method of claim 1:
wherein one single resource for channel measurements is configured within the radio frame;
wherein one respective instance of the CSI report is received for each of the at least two resources for interference measurements; and
wherein each instance of the CSI report comprises reporting of the CSI based on measurements on the one single resource for channel measurements and the measurements on a respective one of the at least two resources for interference measurements.

6. The method of claim 1, wherein one single CSI report is received for all the measurements as performed by a terminal device on the at least two resources for interference measurements and on the at least one resource for channel measurements within the radio frame.

7. The method of claim 6, wherein the one single CSI report comprises as many values of the measurements on the at least two resources for interference measurements as there are resources for interference measurements within the radio frame.

8. The method of claim 6, wherein the one single CSI report comprises one single value of the measurements representative of all the measurements on the at least two resources for interference measurements within the radio frame.

9. The method of claim 1:
wherein at least two resources for channel measurements are configured within the radio frame;
wherein, when there are as many resources for channel measurements as there are resources for interference measurements, one resource for channel measurements and one resource for interference measurements are pair-wise configured within the radio frame where the resources are configured.

10. The method of claim 1, wherein the configuration information is dependent on which slots in the radio frame that, by a neighboring network node, are used for uplink reception and which slots in the radio frame that, by the neighboring network node, are used for downlink transmission.

11. A method for receiving configuration of resources for downlink channel state information (CSI) measurements, the method comprising a terminal device:
receiving, from a network node, the configuration of resources for downlink CSI measurements as configuration information, wherein the resources for downlink CSI measurements comprise at least two resources for interference measurements and at least one resource for channel measurements, and wherein each resource for interference measurement is configured in its own slot within the radio frame, and wherein the configuration information specifies slot locations of the at least two resources for interference measurement and the at least one resource for channel measurement within the radio frame;
receiving, within the radio frame, a reference signal in the at least one resource for channel measurements;
obtaining measurements on the resources for downlink CSI measurements; and
transmitting at least one CSI report of the CSI measurements towards the network node, wherein the one CSI report is configured with a CSI reference signal (CSI-RS) resource set with a single CSI-RS resource for channel measurement and a CSI interference measurement (CSI-IM) resource set with multiple CSI-IM resources wherein the configuration indirectly indicates to a terminal device that the measured interferences in the multiple CSI-IM resources shall be filtered or averaged over the multiple resources, for CSI estimation.

12. The method of claim 11, wherein each of the at least two resources for interference measurements represents a respective channel state information interference measurement (CSI-IM) resource.

13. The method of claim 11, wherein the reference signal received in the at least one resource for channel measurements is a channel state information reference signal (CSI-RS).

14. The method of claim 11:
wherein the radio frame is composed of downlink slots, uplink slots, and flexible slots; and
wherein a respective one of the at least two resources for interference measurements is configured in a respective one of the downlink slots.

15. The method of claim 11:
wherein the configuration information further specifies how many CSI reports the terminal device is to report to the network node; and
wherein the CSIs are reported according to the configuration information.

16. The method of claim 11:
wherein the configuration information further specifies how many CSI reports the terminal device is to report to the network node per radio frame; and
wherein the CSIs are reported according to the configuration information.

17. The method of claim 11, wherein one single resource for channel measurements is configured within the radio frame.

18. The method of claim 17:
wherein one respective instance of the CSI report is transmitted for each of the at least two resources for interference measurements; and
wherein each instance of the CSI report comprises reporting of the CSI based on measurements on the one single resource for channel measurements and the measurements on a respective one of the at least two resources for interference measurements.

19. The method of claim 11, wherein one single CSI report is transmitted for all the measurements as performed by the terminal device on the at least two resources for interference measurements and on the at least one resource for channel measurements within the radio frame.

20. The method of claim 19, wherein the one single CSI report comprises as many values of the measurements on the at least two resources for interference measurements as there are resources for interference measurements within the radio frame.

21. The method of claim 19, wherein the one single CSI report comprises one single value of the measurements representative of all the measurements on the at least two resources for interference measurements within the radio frame.

22. The method of claim 21, wherein the one single value is an average of all the measurements on the at least two resources for interference measurements within the radio frame.

23. The method of claim 21, wherein the one single value is a filtered version of all the measurements on the at least two resources for interference measurements within the radio frame.

24. The method of claim 11:
wherein there are at least three resources for interference measurements within the one single radio frame; and
wherein the CSI report comprises more than one measurement value but less number of measurement values than total number of resources for interference measurements within the radio frame.

25. The method of claim 24, wherein each of the more than one measurement value is representative of interference measurements in slots of respective interference characteristics.

26. The method of claim 11, wherein at least two resources for channel measurements are configured within the radio frame.

27. The method of claim 26, wherein, when there are as many resources for channel measurements as there are resources for interference measurements, one resource for channel measurements and one resource for interference measurements are pair-wise configured within the radio frame where the resources are configured.

28. A network node for configuring resources for downlink channel state information (CSI) measurements, the network node comprising:
processing circuitry configured to cause the network node to:
configure, within a radio frame, the resources for downlink CSI measurements, wherein the resources for downlink CSI measurements comprise at least two resources for interference measurements and at least one resource for channel measurements, and wherein each resource for interference measurement is configured in its own slot within the radio frame;
transmit configuration information, wherein the configuration information specifies slot locations of the at least two resources for interference measurement and the at least one resource for channel measurement within the radio frame, and configuring a CSI report configuration with a CSI reference signal (CSI-RS) resource set with a single CSI-RS resource for channel measurement and a CSI interference measurement (CSI-IM) resource set with multiple CSI-IM resources wherein the configuration indirectly indicates to a terminal device that the measured interferences in the multiple CSI-IM resources shall be filtered or averaged over the multiple resources, for CSI estimation; and
transmit, within the radio frame, a reference signal in the at least one resource for channel measurements.

29. A terminal device for receiving configuration of resources for downlink channel state information (CSI) measurements, the terminal device comprising processing circuitry, the processing circuitry being configured to cause the terminal device to:
receive, from a network node, the configuration of resources for downlink CSI measurements as configuration information, wherein the resources for downlink CSI measurements comprise at least two resources for interference measurements and at least one resource for channel measurements, and wherein each resource for interference measurement is configured in its own slot within the radio frame, and wherein the configuration information specifies slot locations of the at least two resources for interference measurement and the at least one resource for channel measurement within the radio frame;
receive, within the radio frame, a reference signal in the at least one resource for channel measurements;
obtain measurements on the resources for downlink CSI measurements; and
transmit at least one CSI report of the CSI measurements towards the network node, wherein the one CSI report is configured with a CSI reference signal (CSI-RS) resource set with a single CSI-RS resource for channel measurement and a CSI interference measurement (CSI-IM) resource set with multiple CSI-IM resources wherein the configuration indirectly indicates to a terminal device that the measured interferences in the multiple CSI-IM resources shall be filtered or averaged over the multiple resources, for CSI estimation.

* * * * *